United States Patent [19]
Chu et al.

[11] Patent Number: 5,950,233
[45] Date of Patent: Sep. 7, 1999

[54] INTERLEAVED BURST ADDRESS COUNTER WITH REDUCED DELAY BETWEEN RISING CLOCK EDGE AND BURST ADDRESS TRANSFER TO MEMORY

[75] Inventors: Raymond M. Chu, Saratoga; David J. Pilling, Los Altos Hills; John R. Mick, San Jose, all of Calif.

[73] Assignee: Integrated Device Technology, Inc., Santa Clara, Calif.

[21] Appl. No.: 08/755,074

[22] Filed: Nov. 21, 1996

[51] Int. Cl.$^6$ ..................................................... G06F 12/02
[52] U.S. Cl. ..................... 711/218; 365/230.08; 365/239; 711/219
[58] Field of Search .......................... 365/189.05, 230.02, 365/230.06, 230.08, 233, 233.5, 239; 377/56; 711/167, 217, 218, 219

[56] References Cited

U.S. PATENT DOCUMENTS

| | | | |
|---|---|---|---|
| 5,126,975 | 6/1992 | Handy et al. | 365/230.01 |
| 5,452,261 | 9/1995 | Chung et al. | 365/233 |
| 5,493,530 | 2/1996 | Lee et al. | 365/189.05 |
| 5,596,616 | 1/1997 | Jeang | 377/56 |
| 5,627,794 | 5/1997 | Lee | 365/233 |
| 5,634,030 | 5/1997 | Nakano | 711/219 |
| 5,708,688 | 1/1998 | Ting et al. | 365/230.08 |
| 5,729,503 | 3/1998 | Manning | 365/233.5 |

*Primary Examiner*—Eddie P. Chan
*Assistant Examiner*—Gary J. Portka
*Attorney, Agent, or Firm*—Bever & Hoffman

[57] ABSTRACT

A burst address sequencer and method for providing sequential addresses to a memory which operates in response to a clock signal. The burst address sequencer includes a plurality of two-stage address registers, with an address register being provided for each address bit. Prior to an initial rising edge of the clock signal, an initial address is loaded into the first stages of the two-stage address registers. In response to the initial rising edge of the clock signal, the initial address is clocked through the second stages of the two-stage address registers, directly to the memory. Subsequent addresses are derived from the initial address by circuitry within the burst address sequencer. These subsequent burst addresses are provided to the first stages of the addresses registers prior to subsequent rising edges of the clock signal and clocked out to the memory in response to these subsequent rising edges of the clock signal. By providing the addresses directly from the second stage of the address registers to the memory, the logic gate delay associated with providing the addresses to the memory in response to the rising edge of the clock signal is minimized.

2 Claims, 5 Drawing Sheets

15,950,233

INTERLEAVED BURST ADDRESS COUNTER WITH REDUCED DELAY BETWEEN RISING CLOCK EDGE AND BURST ADDRESS TRANSFER TO MEMORY

BACKGROUND OF THE INVENTION

1. Field of the Invention

The present invention relates to semiconductor integrated circuit memories. More particularly, the present invention relates to a method and circuit for generating sequences of address bits to facilitate burst access of a synchronous memory.

2. Description of the Prior Art

FIG. 1 is a schematic diagram of a conventional burst address counter 100 for a synchronous memory 101. Burst address counter 100 provides a sequence of burst address signals A'[14:0] which point to contiguous memory storage locations within memory 101, such that the data values (e.g., DATA[M:N]) stored at these locations are readily accessible to the system data bus 102.

Burst address counter 100 includes binary counter 110, address register 111, AND gates 112 and 113, exclusive NOR gates 114 and 115, and inverters 116–117. Binary counter 110 includes registers 121 and 122, inverter 123 and exclusive OR gate 124. Burst counter 100 operates as follows. Prior to a burst access, the initialization signal (INIT), which is applied to an input terminal of AND gate 112, and the advance signal (ADV), which is applied to an input terminal of AND gate 113, are both in logic low states. As a result, the clock signal (CLK), which is applied to input terminals of both AND gate 112 and AND gate 113, has no effect on the output signals provided by AND gates 112 and 113. To initiate a burst access, the INIT signal is asserted high. When the CLK signal next transitions to a logic high state, AND gate 112 provides a logic high CLEAR signal to the clock input terminal of address register 111 and to the clear input terminals of registers 121 and 122. This logic high CLEAR signal causes an initial address signal A[14:0] to be latched into address register 111. This initial address signal A[14:0] remains latched in register 111 until the next rising edge of the CLEAR signal. The logic high CLEAR signal also clears the contents of registers 121 and 122, thereby initializing the Q0 and Q1 output signals provided by registers 121 and 122, respectively, to logic low values (i.e, Q1, Q0=0,0).

The logic low Q0 and Q1 output signals are applied to input terminals of exclusive NOR gates 114 and 115, respectively. The two least significant address bits, A[0] and A[1], are also applied to input terminals of exclusive NOR gates 114 and 115, respectively. The output signals provided by exclusive NOR gates 114 and 115 are routed through inverters 116 and 117, respectively, to provide burst address signals A'[0] and A'[1], respectively. The logic low values of the Q0 and Q1 output signals cause the burst address signals A'[0] and A'[1] to be initially equal to input address signals A[0] and A[1], respectively. The burst address signals A'[1] and A'[0] are concatenated with initial address bits A[14:2] to form burst address A'[14:0].

The INIT signal is subsequently de-asserted low, thereby causing the CLEAR signal to transition to a logic low state. The ADV signal is then asserted high, thereby enabling the CLK signal to be transmitted through AND gate 113. The CLK signal is applied to the clock input terminals of registers 121 and 122. On successive rising edges of the CLK signal, the Q1, Q0 output signals transition from their initial values of 0,0 to 0,1 to 1,0 to 1,1. As a result, the burst address signals A'[1] and A'[0] transition from their initial values of A[1] , A[0] to A[1] , A[0] to A[1], A[0] to A[1] , A[0] . Address signals A[14:2] remain constant during this time. Consequently, the burst address signals A'[14:0] are automatically incremented in a predetermined sequence in response to the CLK signal. Burst counter 100 can operate in an interleaved or linear mode, and may count up or down, depending upon the initial address and operational mode.

The logic circuitry within burst address counter 100 introduces delay in providing the burst address signal A'[14:0] to memory 101. Important delay parameters in synchronous memories include the address set-up time, the address hold time, and the time required for valid data to be provided by the memory after the initial transition of the clock signal. The address set-up time is defined as the amount of time that the address must be valid before a transition of the clock signal (e.g., a low to high transition) activates the burst counter 100 to load the initial address. The address hold time is defined as the time that the address must be present after the clock transition so as to insure the capture of the value address by the burst counter 100.

There are three and a half logic gate delays which exist between the transition of the CLK signal and the generation of burst address signal A'[14:0] in burst address counter 100. A logic gate delay is defined as the time required for a signal to pass through a logic device. Binary counter 110 introduces one logic gate delay, exclusive NOR gates 114 and 115 introduce 1.5 logic gate delays and inverters 116 and 117 introduce one logic gate delay. FIG. 2 is a schematic diagram of exclusive NOR gate 114 and inverter 116. Exclusive NOR gate 114 includes two inverters 201 and 202, which introduce one logic gate delay, and transmission gates 203 and 204, which introduce one-half logic gate delay. Inverter 116 introduces one logic gate delay.

FIG. 3 is a timing diagram illustrating the 3.5 logic gate delays between the rising edge of the CLK signal and generation of burst address signal A'[14:0]. This logic gate delay is included in the address set-up time, the address hold time, and the time required for valid data to be provided by the memory after the initial transition of the clock signal. It would therefore be desirable to reduce the logic gate delay between the rising edge of the clock signal and the generation of the burst address signal A'[14:0].

SUMMARY

Accordingly, the present invention provides a burst address sequencer and method which minimizes the logic gate delay between the rising edge of the clock signal and the application of a burst address signal to the memory. In one embodiment, the burst address sequencer includes a plurality of two-stage address registers. Each of these two-stage address registers stores a corresponding bit of the burst address. Prior to an initial rising edge of the clock signal (i.e., the rising edge which initiates the memory access), the initial burst address is loaded into the first stages of the two-stage address registers. In response to the initial rising edge of the clock signal, the initial burst address is clocked from the first stages of the two-stage address registers to the second stages of the two-stage address registers. The initial burst address is provided directly from the second stages of the two-stage address registers to the memory, thereby minimizing the logic gate delay associated with transferring the burst address to the memory. Approximately 1.5 logic gate delays are introduced when transferring the initial burst address from the first stages to the second stages of the two-stage address registers. Thus, the present invention advantageously reduces the logic gate delay by 2 logic gate delays with respect to the prior art burst address sequencers.

The burst address sequencer derives subsequent burst addresses from the initial burst address. The second burst address is loaded into the first stages of the two-stage address registers prior to the next rising edge of the clock signal. As a result, the second burst address is clocked through the second stages of the two-stage address registers with 1.5 logic gate delays when the next rising edge of the clock signal is received by the two-stage address registers. This process continues until all of the desired burst addresses have been provided to the memory.

The present invention will be more fully understood in light of the following detailed description taken together with the drawings.

DETAILED DESCRIPTION

Figure 1:
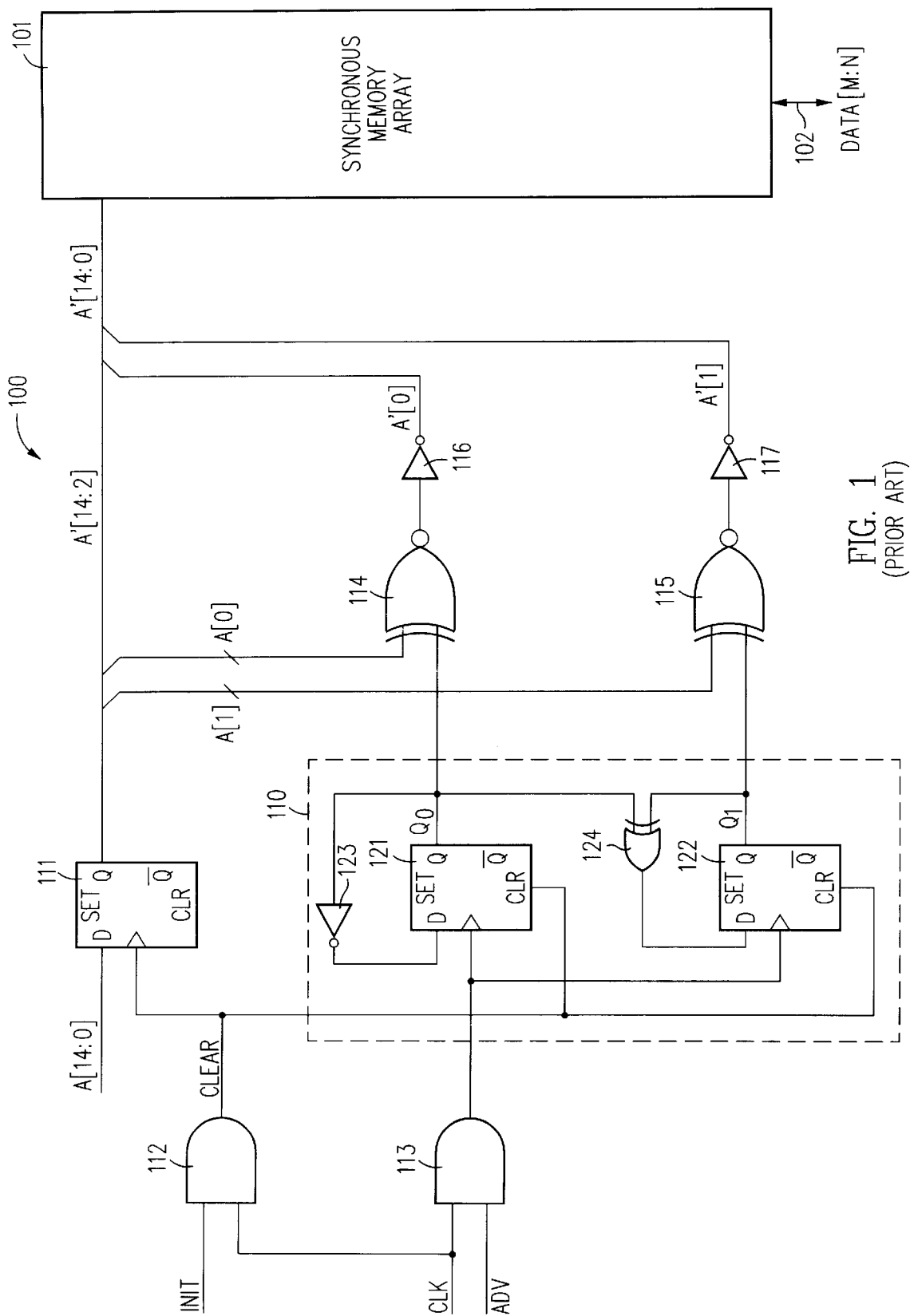
FIG. 1 is a schematic diagram of a conventional burst address counter for a synchronous memory.
Figure 2:
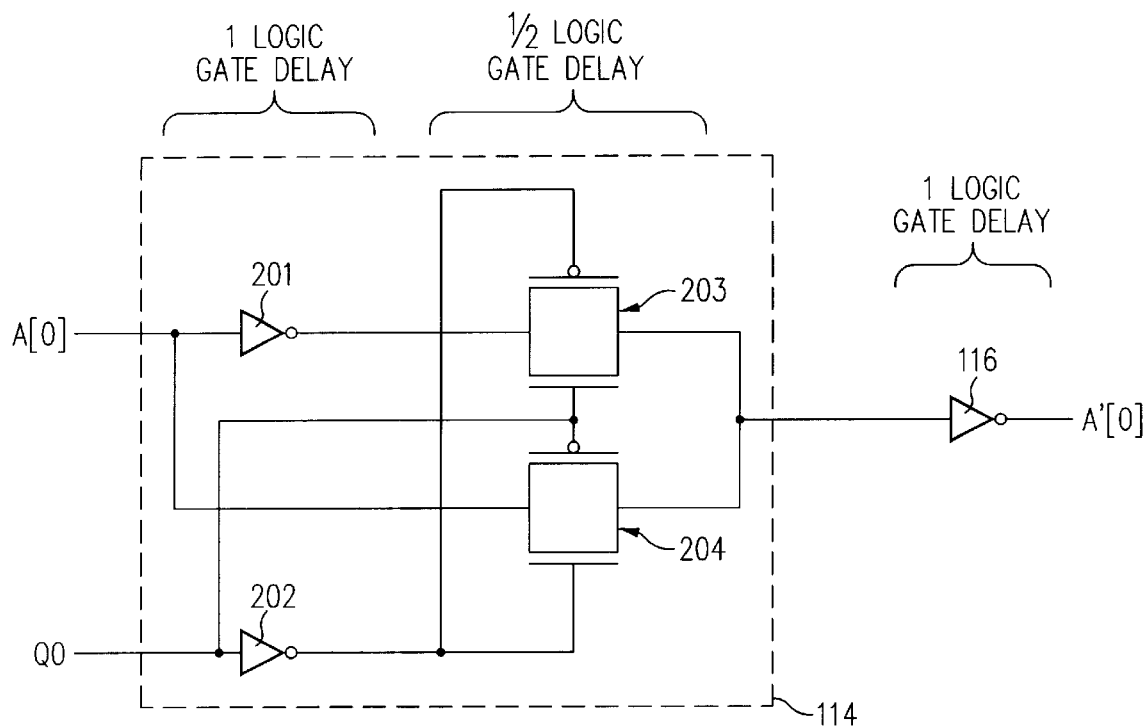
FIG. 2 is a schematic diagram of an exclusive NOR gate and inverter found in the conventional burst address counter of FIG. 1.
Figure 3:
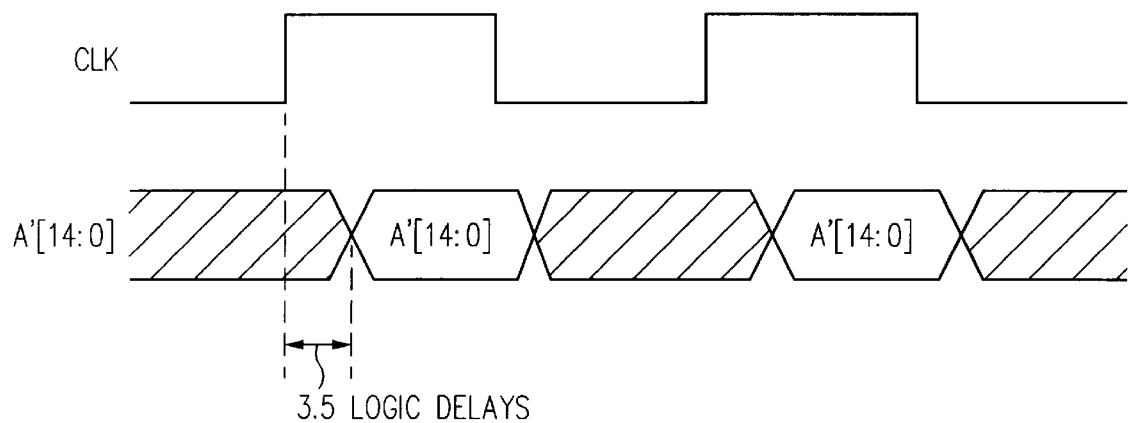
FIG. 3 is a timing diagram illustrating a 3.5 logic gate delay which exists in the conventional burst address counter of FIG. 1.
Figure 4:
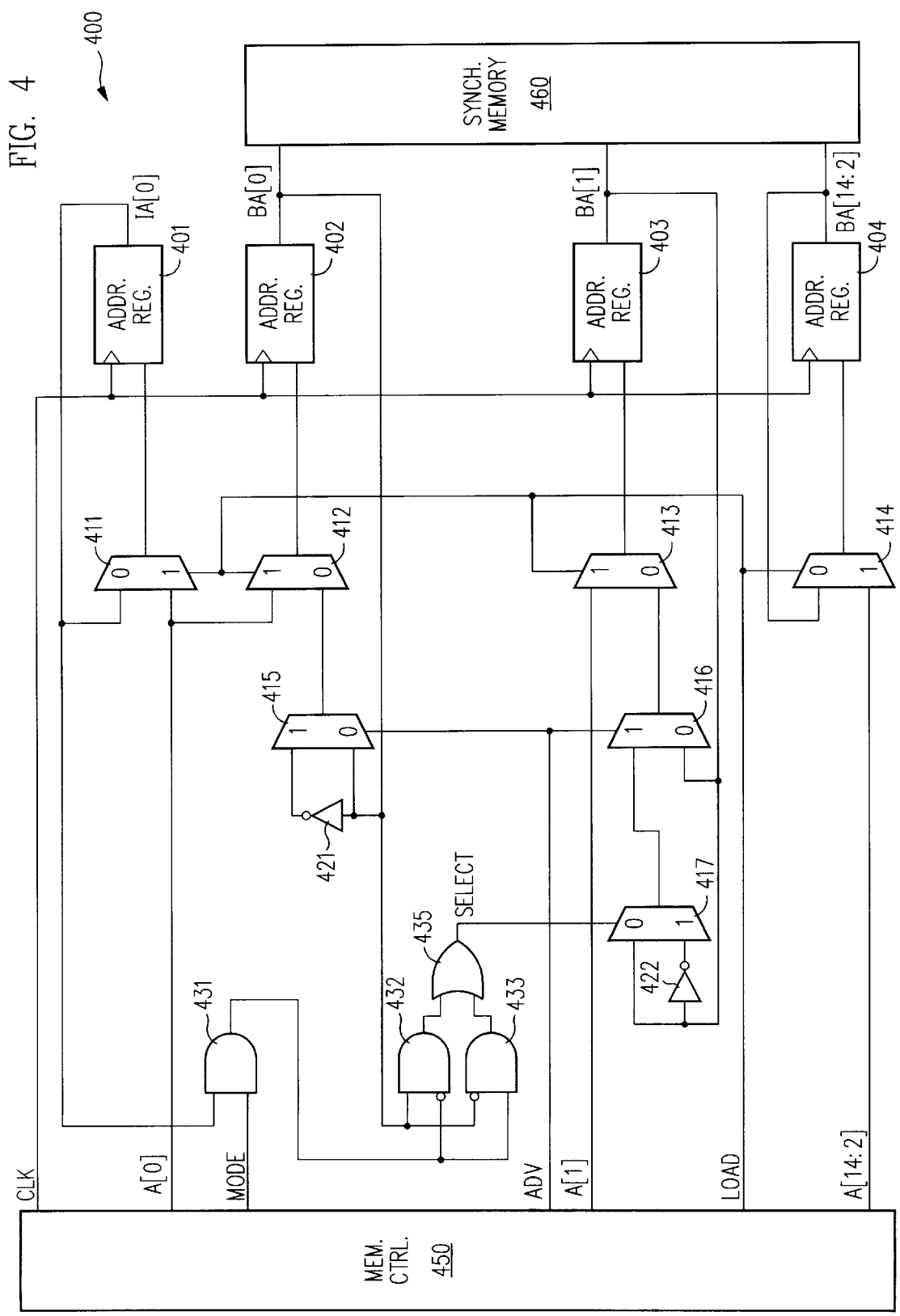
FIG. 4 is a schematic diagram of a burst address sequencer in accordance with one embodiment of the invention.

FIG. 4 is a schematic diagram of a burst address sequencer 400 in accordance with one embodiment of the invention. Burst address sequencer 400 includes two-stage address registers 401–404, multiplexers 411–417, inverters 421 and 422, AND gates 431–433 and OR gate 435. Burst address sequencer 400 receives address signals A[14:0], a clock (CLK) signal, a burst mode (MODE) signal, an advance (ADV) signal and a load (LOAD) signal from memory control circuit 450. In response to these signals, burst address sequencer 400 provides burst address signals BA[14:0] to synchronous memory 460. As described in more detail below, the burst address signals BA[1] and BA[0] are read out of address registers 403 and 402 to synchronous memory 460 with 1.5 logic gate delays in response to the CLK signal.

Address registers 401–404 are each clocked by the CLK signal. The data input terminals of registers 401, 402, 403 and 404 are connected to the output terminals of respective multiplexers 411, 412, 413 and 414. Multiplexers 411–414 are each two-to-one multiplexers having a "0" input terminal and a "1" input terminal. Each of these multiplexers 411–413 also has a control terminal which is connected to receive the LOAD signal. The value of the LOAD signal determines whether the "0" input terminal or the "1" input terminal is connected to the output terminal of the particular multiplexer. For example, a LOAD signal having a logic "0" (or "1") value causes the "0" (or "1") input terminal of the particular multiplexer to be connected to the output terminal of the multiplexer.

The "0" input terminal of multiplexer 411 is connected to the output terminal of register 401, and the "1" input terminal of multiplexer 411 is connected to receive the A[0] address signal. The "0" input terminal of multiplexer 412 is connected to the output terminal of multiplexer 415, and the "1" input terminal of multiplexer 412 is connected to receive the A[0] address signal. The "0" input terminal of multiplexer 413 is connected to the output terminal of multiplexer 416, and the "1" input terminal of multiplexer 413 is connected to receive the A[1] address signal. The "0" input terminal of multiplexer 414 is connected to the output terminals of address register 404, and the "1" input terminal of multiplexer 414 is connected to receive address signals A[14:2].

The control terminals of multiplexers 415 and 416 are connected to receive the ADV signal. The "0" input terminal of multiplexer 416 is connected to the output terminal of address register 403, and the 11111 input terminal of multiplexer 416 is connected to the output terminal of multiplexer 417. The "0" input terminal of multiplexer 415 is connected to the output terminal of address register 402. The "1" input terminal of multiplexer 415 is connected to the output terminal of address register 402 through inverter 421. The "0" input terminal of multiplexer 417 is connected to the output terminal of address register 403. The "1" input terminal of multiplexer 417 is connected to the output terminal of address register 403 through inverter 422.

The input terminals of AND gate 431 are connected to receive the initial address signal IA[0] and the MODE signal. The output terminal of AND gate 431 is connected to the inverting input terminal of AND gate 432 and to the non-inverting input terminal of AND gate 433. The output terminal of address register 402 is connected to the non-inverting input terminal of AND gate 432 and to the inverting input terminal of AND gate 433. The output terminals of AND gates 432 and 433 are connected to input terminals of OR gate 435. The output terminal of OR gate 435 is connected to the control terminal of multiplexer 417.

In accordance with one embodiment of the invention, burst address sequencer 400 operates as follows. Prior to the activation of burst address sequencer 400, the LOAD and ADV signals are maintained at logic low levels. As a result, the address signal IA[0] currently stored in address register 401 is provided back to the input terminal of address register 401 through multiplexer 411. Similarly, the address signal BA[0] currently stored in address register 402 is provided back to the input terminal of address register 402 through multiplexers 415 and 412. The address signal BA[1] currently stored in address register 403 is provided back to the input terminal of address register 403 through multiplexers 416 and 413. In addition, the address signals BA[14:2] stored in address register 404 are provided back to the input terminal of address register 404 through multiplexer 414. As a result, the values currently stored in address registers 401, 402, 403 and 404 are continuously re-loaded into respective address registers 401, 402, 403 and 404 at each rising edge of the CLK signal.

To activate burst address sequencer 400, the desired initial address signal A[0] is provided to the "1" input terminals of multiplexers 411 and 412, the desired initial address signal A[1] is provided to the "1" input terminal of multiplexer 413, the desired initial address signals A[14:2] are provided to the "1" input terminals of multiplexer 414, the LOAD signal is asserted high, and the ADV signal is asserted high, and the MODE signal is selected to be either high or low, as described in more detail below.

The logic high LOAD signal causes the initial address signal A[0] to be routed through multiplexers 411 and 412 to the input terminals of address registers 401 and 402. The logic high LOAD signal also causes the initial address signal A[1] to be routed through multiplexer 413 to the input terminal of address register 403. Similarly, initial address signals A[14:2] are routed through multiplexer 414 to the input terminals of address register 404.

As described in more detail below, the initial address signals A[0], A[1] and A[14:2] are loaded into the first stages of two-stage address registers 402, 403 and 404, respectively. On the initial rising edge of the CLK signal (after the LOAD signal has been asserted), the initial address signal A[0] is clocked through the second stage of address register 401 (as initial address signal IA[0]) and the second stage of address register 402; the initial address signal A[1] is clocked through the second stage of address register 403; and the initial address signals A[14:2] are clocked through the second stage of address register 404.

Figure 5:
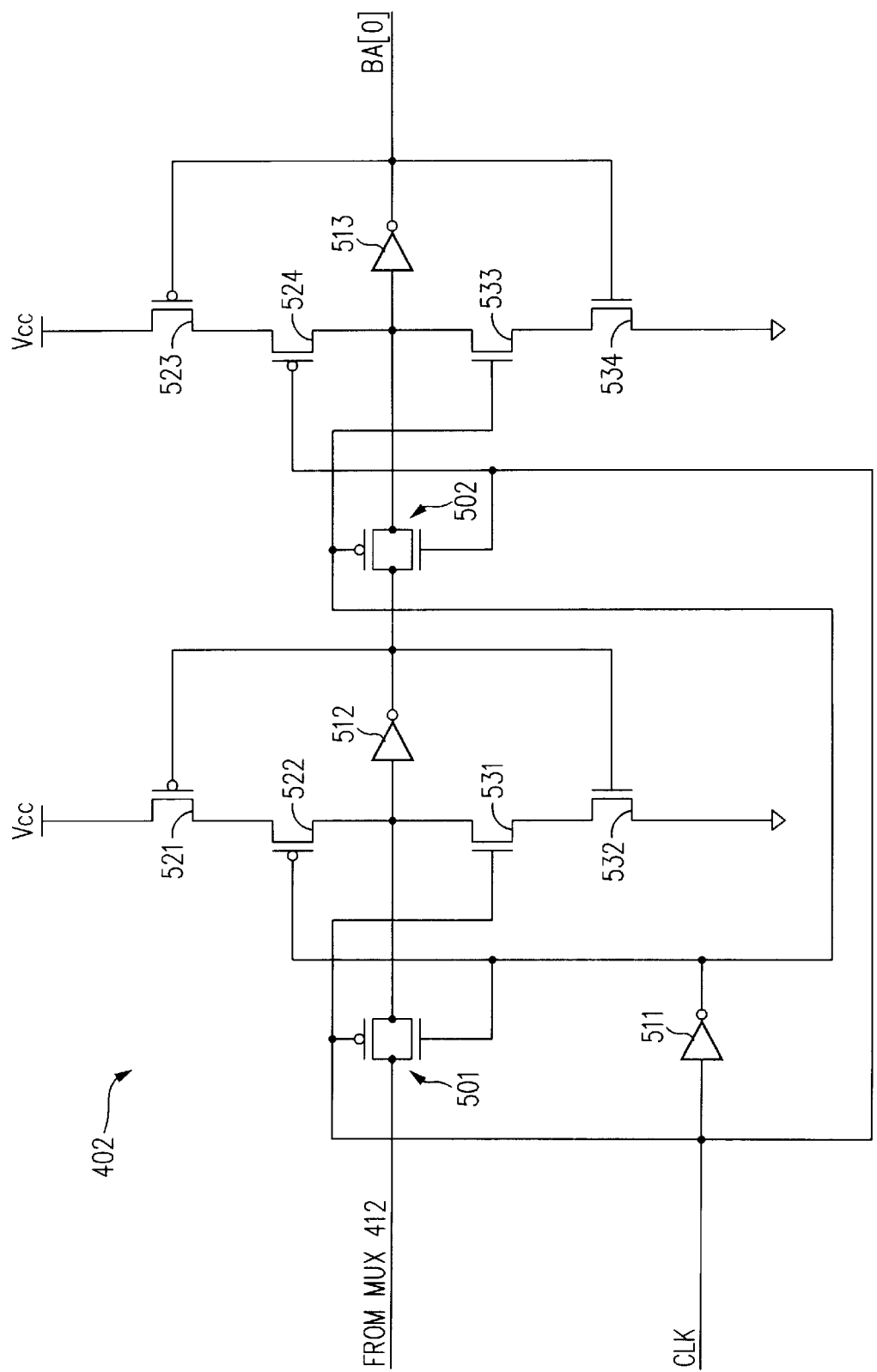
FIG. 5 is a schematic diagram of a two-stage address register of the burst address sequencer of FIG. 4 in accordance with one embodiment of the invention.

FIG. 5 is a schematic diagram of a two-stage address register 402 in accordance with one embodiment of the invention. In the described embodiment, address registers 401 and 403 are identical to address register 402. Address register 404 includes thirteen parallel address registers which are identical to address register 402. Address register 402 includes transmission gates 501 and 502, inverters 511–513, p-channel field effect transistors (FETs) 521–524 and n-channel FETs 531–534. The first stage of two-stage address register 402 includes transmission gate 501, inverters 511 and 512, p-channel FETs 521–522 and n-channel FETs 531–532. The second stage of two-stage address register 402 includes transmission gate 502, inverters 511 and 513, p-channel FETs 523–524 and n-channel FETs 533–534.

When the address signal A[0] is applied to register 402 and the CLK signal is in a logic low state, transmission gate 501 is in a conductive state and transmission gate 502 is in a non-conductive state. P-channel transistor 522 and n-channel transistor 531 are both in non-conductive states. The address signal A[0] is applied to the input terminal of inverter 512. The output signal provided by inverter 512 turns on either p-channel transistor 521 or n-channel transistor 532, depending on the logic value of address signal A[0]. A logic high address signal A[0] will cause p-channel transistor 521 to turn on, while a logic low address signal A[0] will cause n-channel transistor 532 to turn on. In this manner, the address signal A[0] is initially stored in the first stage of two-stage address register 402.

When the CLK signal transitions from the logic low state to the logic high state, transmission gate 502 enters a conductive state and transmission gate 501 enters a non-conductive state. P-channel transistor 522 and n-channel transistor 531 are turned on. As a result, the address signal A[0] is latched at the input terminal of inverter 512. Because transmission gate 502 is in a conductive state, this address signal A[0] is routed through this transmission gate 502 and the inverter 513 and output as burst address signal BA[0]. In this manner, the address signal A[0] is transmitted through the second stage of two-stage address register 402 to memory 460. The delay introduced from the rising edge of the CLK signal is approximately 1.5 logic gate delays, or the time required for the address signal A[0] to travel through transmission gate 502 and inverter 513. Consequently, the time between the rising edge of the CLK signal and the assertion of the burst address signal BA[0] is greatly reduced when compared with the prior art burst address counters.

Although two-stage address register 402 has been described in connection with particular circuitry, the present invention is not limited to this particular circuitry. Other two-stage registers are possible and known to those of ordinary skill in the art. Such two-stage registers are considered to be included within the scope of the present invention.

Figure 6:
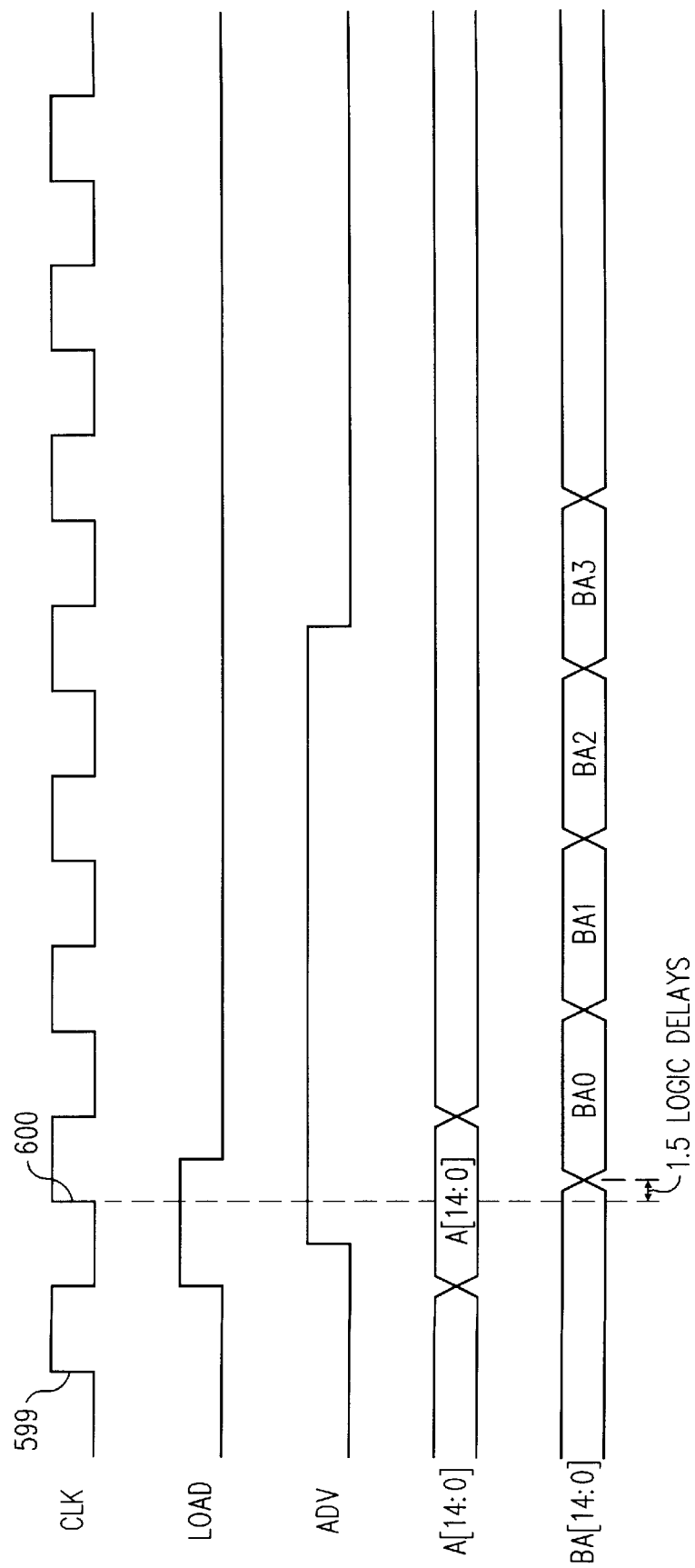
FIG. 6 is a waveform diagram illustrating various signals within the burst address sequencer of FIG. 4.

FIG. 6 is a waveform diagram illustrating the CLK, LOAD, ADV, A[14:0] and BA[14:0] signals in accordance with one embodiment of the invention. As illustrated in FIG. 6, the LOAD and ADV signals are asserted high at some time after the rising edge 599 and before the rising edge 600 of the CLK signal. In addition, an initial address signal A[14:0] is provided to burst address sequencer 400. One and one half logic gate delays after initial rising clock edge 600 (after the LOAD signal has been asserted), the initial burst address BA0 is provided from burst address sequencer 400 to synchronous memory 460. During the next three successive cycles of the CLK signal, burst address sequencer 400 generates subsequent burst address signals BA1, BA2 and BA3. The upper 13 bits of burst address signals BA0–BA3 are identical, while the lower 2 bits of these burst address signals BA0–BA3 are sequentially changed by burst address sequencer 400 in the manner described below.

Returning now to FIG. 4, after the initial address signal A[14:0] is loaded into address registers 401–404 in response to the initial rising edge 600 of the CLK signal, the LOAD signal transitions to a logic low level before the next rising edge of the CLK signal. As a result, the "0" input terminals of multiplexers 411–414 are connected to their respective output terminals. Consequently, the initial address signal A[0] loaded into address register 401 remains in address register 401 as initial address signal IA[0]. As described in more detail below, this initial address signal IA[0] is used to determine the burst sequence. Similarly, the initial address signal A[14:2] loaded into address register 404 remains in address register 404.

The logic high ADV signal causes the burst address signal BA[0] to be routed through inverter 421, multiplexer 415 and multiplexer 412 to the input terminal of address register 402. As a result, the inverse of the current burst address signal BA[0] is loaded into address register 402 on the next rising edge of the CLK signal. In this manner, the burst address signal BA[0] changes states with each successive rising edge of the CLK signal. In this manner, the least significant bit of the burst address signal BA[14:0] is advanced during each cycle of the CLK signal.

The burst address signal BA[1] is routed from the output terminal of address register 403 to the "0" input terminal of multiplexer 417. The burst address signal BA[1] is also routed from the output terminal of address register 403 through inverter 422 to the "1" 1 input terminal of multiplexer 417. The signal provided at the output terminal of multiplexer 417 is loaded into address register 403 during the next rising edge of the CLK signal (through multiplexers 416 and 413).

The signal provided at the output terminal of multiplexer 417 is determined by SELECT signal provided at the output terminal of OR gate 435. The SELECT signal will be equal to the burst address signal BA[0] or the inverse of the burst address signal BA[0], depending on the status of the MODE signal and the initial address signal IA[0]. If both the MODE signal and the initial address signal IA[0] have logic "1" values, then the SELECT signal will be equal to the inverse of the burst address signal BA[0]. If either the MODE signal or the initial address signal IA[0] has a logic "0" value, then the SELECT signal will be equal to the burst address signal BA[0].

The burst address sequence will vary based on the state of the MODE signal and the initial values of burst address signals BA[1] and BA[0]. Table 1 lists the burst sequences provided by burst address sequencer 400 in response to the various MODE and initial address signals BA[0], BA[1]. The dash (–) symbol in Table 1 indicates that the MODE signal can have a 0 or a 1 value.

TABLE 1

| MODE | Initial BA[0] (IA[0]) | Initial BA[1] | Least significant bits BA[1] and BA[0] of Burst Addresses BA0, BA1, BA2, BA3 |
|---|---|---|---|
| — | 0 | 0 | 00, 10, 10, 11 |
| — | 0 | 1 | 10, 11, 00, 01 |
| 0 | 1 | 0 | 01, 10, 11, 00 |
| 0 | 1 | 1 | 11, 00, 01, 10 |
| 1 | 1 | 0 | 01, 00, 11, 10 |
| 1 | 1 | 1 | 11, 10, 01, 00 |

Thus, when the MODE and IA[0] signals are not both logic "1" values, the burst address sequence is a count up function, starting with the initial burst address signals BA[1] and BA[0]. When the MODE and IA[0] signals are both logic "1" values, the burst address sequence is a count down function, starting with the initial burst address signals BA[1] and BA[0].

The foregoing has described the principles and preferred embodiments of the present invention. However, the invention should not be construed as being limited to the particular embodiments described. For example, the described burst address sequencer can be modified to provide other possible burst address sequences in accordance with the particular addressing requirements of the memory being accessed. Moreover, the described burst address sequencer is not limited to a 15-bit address or a four address burst length. Other address sizes and burst lengths are contemplated and considered to be within the scope of the present invention. Thus, above-described embodiments should be regarded as illustrative rather than restrictive. Variations can be made to those embodiments by workers skilled in the art without departing from the scope of the present invention as defined by the following claims.

We claim:

1. A burst address sequencer for accessing a memory which operates in response to a clock signal, the burst address sequencer comprising:

a first plurality of registers for storing a first plurality of address bits which are changed during a burst address sequence, wherein the first plurality of registers are directly connected to the memory;

a second plurality of registers for storing a second plurality of address bits which remain unchanged during a burst address sequence, wherein the second plurality of registers are directly connected to the memory;

a first plurality of multiplexers coupled to receive the first plurality of address bits, wherein the first plurality of multiplexers pass the first plurality of address bits, thereby causing the first plurality of address bits to be loaded into the first plurality of registers in response to a load control signal;

a second plurality of multiplexers coupled to receive the second plurality of address bits, wherein the second plurality of multiplexers pass the second plurality of address bits, thereby causing the second plurality of address bits to be loaded into the second plurality of registers in response to the load control signal; and a clock signal line which transmits the clock signal, the clock signal line being coupled to each of the first and second plurality of registers, wherein the first and second plurality of address bits are transmitted directly from the first and second plurality of registers to the memory in response to a first transition of the clock signal.

2. The burst address sequencer of claim 1, wherein less than two logic gate delays are introduced in transmitting the first and second plurality of address bits from the first and second plurality of registers to the memory.

* * * * *